(12) United States Patent
Tirrell

(10) Patent No.: US 8,413,672 B2
(45) Date of Patent: Apr. 9, 2013

(54) VALVE FLUSHING KIT

(75) Inventor: Paul Talmage Tirrell, Plymouth, MA (US)

(73) Assignee: Dresser, Inc., Addison, TX (US)

( * ) Notice: Subject to any disclaimer, the term of this patent is extended or adjusted under 35 U.S.C. 154(b) by 381 days.

(21) Appl. No.: 12/782,763

(22) Filed: May 19, 2010

(65) Prior Publication Data
US 2011/0284097 A1 Nov. 24, 2011

(51) Int. Cl.
*B08B 3/00* (2006.01)

(52) U.S. Cl.
USPC ......... 137/15.04; 137/238; 137/240; 137/271

(58) Field of Classification Search ............... 137/15.04, 137/15.05, 238–240, 269, 271
See application file for complete search history.

(56) References Cited

U.S. PATENT DOCUMENTS

| | | | | |
|---|---|---|---|---|
| 3,834,666 | A * | 9/1974 | Keith | 251/361 |
| 4,718,450 | A * | 1/1988 | Ezekoye | 137/494 |
| 5,728,942 | A | 3/1998 | Boger | |
| 6,761,184 | B1 * | 7/2004 | Jordan | 137/238 |
| 6,807,985 | B2 | 10/2004 | Stares et al. | |
| 6,935,371 | B2 | 8/2005 | Stares | |
| 7,069,950 | B1 | 7/2006 | Bittner | |
| 7,104,281 | B2 | 9/2006 | Stares et al. | |
| 7,748,401 | B2 * | 7/2010 | Zecchi et al. | 137/315.05 |
| 8,033,294 | B2 * | 10/2011 | Greif | 251/367 |

* cited by examiner

*Primary Examiner* — Kevin Lee
(74) *Attorney, Agent, or Firm* — Hiscock & Barclay LLP

(57) ABSTRACT

Some embodiments of a valve flushing kit used in temporarily flushing a globe valve can include a flushing bonnet assembly that includes a circular disk adapted to be received in the upper opening of an internal valve cavity of a valve when a closure bonnet and a closure member of the valve are removed and a plurality of bonnet clamps each having at least one opening therethrough, wherein the opening can be adapted to be received on one of the threaded studs protruding from the upper exterior surface of a body of the valve and the bonnet clamps can be held in place by the threaded nut.

25 Claims, 13 Drawing Sheets

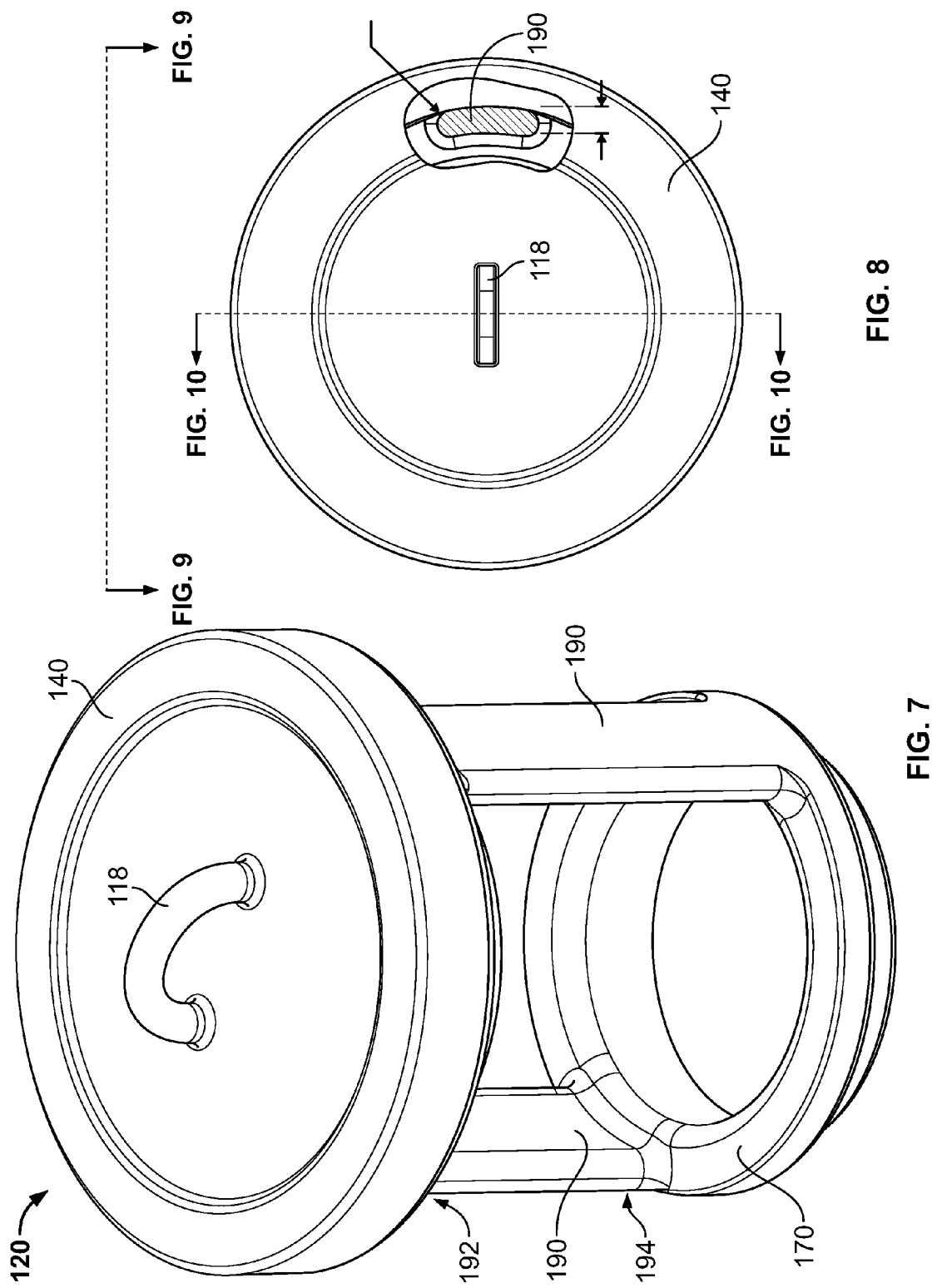

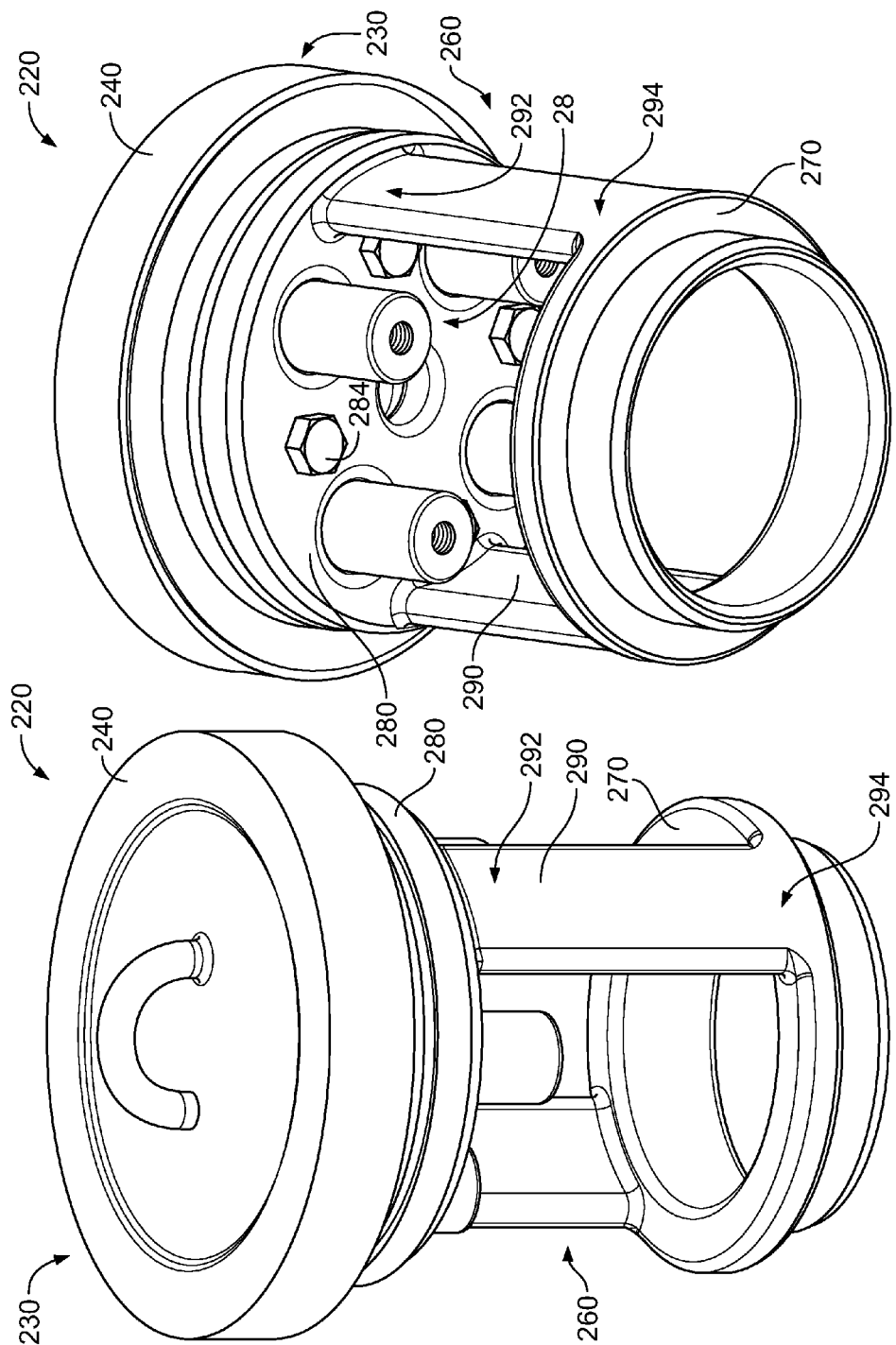

VALVE FLUSHING KIT

TECHNICAL FIELD

This document relates to systems and methods for protecting a globe valve, in particular for protection of the valve when a piping system in which the valve is installed is being flushed for cleaning.

BACKGROUND

Some fluid flow systems, such as natural gas or crude oil distribution networks or processing plant and refinery piping systems (hereinafter piping system), require periodic maintenance that includes flushing of the piping system in which globe valves are installed. For example, a portion of a piping system that includes one or more valves may be drained and flushed prior to repair and/or after a repair to a portion of that piping system. In such circumstances, flushing of the system may include flushing one or more of the valves in the system. Since these valves can be damaged by the flushing process (e.g., by the high pressure flow of contaminants through the valves), the valves can be prepared prior to flushing such that internal components of the valves are either removed or protected. A variety of globe valves exist with different configurations, such as size of the nominal internal diameter of the valve inlet and exit (e.g., 4 inch, 6 inch, 8 inch, etc.), nominal pressure rating (ANSI 600#, 900#, 1500# etc.), all of which affect the configuration of the valve's internal cavities, bolt patterns securing the actuator assemblies, and the like, thus requiring different prior art equipment customized for each valve to replace the internal components of the valves, protect the interior surfaces of the valves, and seal the internal cavities of the valves from the surrounding environment.

SUMMARY

Some embodiments of a flushing kit can be used for temporarily flushing a globe valve, wherein the globe valve can have a valve body defining an internal cavity for receiving a linear reciprocating closure member, a first internal fluid passage connecting a valve inlet to the internal cavity, and a second internal fluid passage connecting the internal cavity to a valve outlet. The internal cavity of the globe valve can have an upper opening closed by a closure bonnet held in place with threaded nuts received on a plurality of threaded studs protruding from an upper exterior surface of the valve body, and a lower opening in the internal cavity having a closure seat and seat gasket adapted to receive the closure member.

In particular embodiments, a flushing kit can include a flushing bonnet assembly that includes a circular disk adapted to be received in the upper opening of an internal valve cavity of a valve when a closure bonnet and a closure member of the valve are removed. The flushing kit can also include one or more downwardly disposed legs connected at a proximal end to a bottom side of the circular disk. The kit may further include a seat protection ring adapted to contact a seat gasket of the valve or be disposed in close proximity thereto and thereby protect a closure seat of the valve, wherein the seat protection ring is connected to a distal end of the one or more legs. The flushing kit can also include a plurality of bonnet clamps each having at least one opening therethrough, wherein the opening can be adapted to be received on one of the threaded studs protruding from the upper exterior surface of a body of the valve. The bonnet clamps can be held in place by a threaded nut. In some aspects, the flushing kit can further include a plurality of bushings each having an exterior diameter sized to be received in the opening of each of the bonnet clamps and having an internal diameter of sized to be received on the threaded studs protruding from the upper exterior surface of the valve body. In further aspects, the bonnet clamps can have two or more holes of varying diameters wherein at least one of the diameters is sized to be received on the threaded studs protruding from the upper exterior surface of the valve body. In still other aspects, the flushing kit can include a plurality of bushings each having an exterior diameter sized to be received in at least one of the openings of each of the bonnet clamps and having an internal diameter sized to be received on the threaded studs protruding from the upper exterior surface of the valve body.

In some embodiments, a flushing kit temporarily used for flushing a globe valve includes a flushing bonnet assembly that includes a circular disk adapted to be received in an upper opening of a cavity of the valve when the closure bonnet and the closure member are removed. The flushing kit can also include at least two downwardly disposed connectors, each attached at a proximal end to the bottom side of the circular disk. The flushing kit can further include an adapter plate configured to receive a distal end of the connectors and can be attached to the connectors. The flushing kit can include one or more downwardly disposed legs connected at a proximal end to a bottom side of the adapter plate and a seat protection ring adapted to contact a closure seat gasket of the valve or be disposed in close proximity thereto and thereby protect a closure seat of the valve, wherein the seat protection ring is connected to a distal end of the one or more legs. The flushing kit can further include a plurality of bonnet clamps each having at least one opening therethrough, wherein the opening can be adapted to be received on one of the threaded studs protruding from the upper exterior surface of the valve body and held in place by a threaded nut. In some aspects, the connectors can have a bore on each of their distal ends with internal threads therein and the adapter plate can be connected to the downwardly disposed connectors with a threaded bolt received in the threaded bore on the end of each of the connectors. In further aspects, the adapter plate can include at least two recesses adapted to receive the distal ends of the downwardly disposed connectors. In some aspects, the adapter plate can include at least two openings sized to allow one of the downwardly disposed connectors to pass through each opening and allow the bottom side of the blind flushing bonnet to contact an upper side of the adapter plate. In further aspects, the adapter plate can include at least two additional openings each sized to allow a threaded end of a bolt to pass therethrough, wherein said bolt is received in a threaded bore in the bottom of the circular disk.

In some embodiments, a flushing bonnet assembly temporarily used for flushing a globe valve includes a circular disk adapted to be received in an upper opening of a cavity of the valve when a closure bonnet and a closure member of the valve are removed. The flushing bonnet can include one or more downwardly disposed legs connected at a proximal end to a bottom side of the circular disk. The flushing kit can further include a seat protection ring adapted to contact a seat gasket of the valve or be disposed in close proximity thereto, wherein the seat protection ring can be connected to a distal end of the one or more legs.

In particular embodiments, a flushing bonnet assembly used temporarily for flushing a globe valve includes a circular disk adapted to be received in an upper opening of a cavity of the valve when the closure bonnet and the closure member of the valve are removed. The flushing bonnet can include at least two downwardly disposed connectors, each attached at a proximal end to a bottom side of the circular disk. In some embodiments, the flushing bonnet can include an adapter plate configured to receive a distal end of the connectors and be attached to the adapter plate. In further embodiments, the flushing bonnet can include one or more downwardly disposed legs connected at a proximal end to a bottom side of the adapter plate and a seat protection ring adapted to contact a seat gasket of the valve or be disposed in close proximity thereto, wherein the seat protection ring is connected to a distal end of the one or more legs.

In some embodiments, a method of using a flushing kit for temporarily flushing a globe valve includes removing a closure bonnet of the valve, removing a closure member of the valve and installing a flushing bonnet assembly in an upper opening of the valve body. The flushing bonnet assembly can include a circular disk adapted to be received in the upper opening of the valve body, wherein the flushing bonnet assembly can further include one or more downwardly disposed legs connected at a proximal end to a bottom side of the circular disk. The flushing bonnet assembly can include a seat protection ring connected to a distal end of the one or more legs, wherein the seat protection ring can be adapted to be disposed in close proximity to the closure seat. The method can include installing a plurality of bonnet clamps each having at least one opening therethrough, wherein the opening can be adapted to be received on one of the threaded studs protruding from an upper exterior surface of the valve body and held in place by a threaded nut. In some aspects, the method can include inserting a plurality of bushings each having an exterior diameter sized to be received in at least one of the openings of each of the bonnet clamps and having an internal diameter sized to be received on the threaded studs protruding from the upper exterior surface of the valve body.

In some embodiments, a method of using a flushing kit for temporarily flushing a globe valve includes removing a closure bonnet of the valve, removing a closure member of the valve, and installing a flushing bonnet assembly in an upper opening of a cavity of the valve. The flushing bonnet assembly can include a circular disk adapted to be received in the upper opening of the valve cavity and at least two downwardly disposed connectors, each attached at a proximal end to a bottom side of the circular disk. The flushing bonnet assembly can further include an adapter plate configured to receive a distal end of the connectors and be attached to the connectors, one or more downwardly disposed legs connected at a proximal end to a bottom side of the adapter plate, and a seat protection ring connected to a distal end of the one or more legs, wherein the seat protection ring can be adapted to be disposed in close proximity a closure seat of the valve. The method can further include installing a plurality of bonnet clamps each having at least one opening therethrough, wherein the opening can be adapted to be received on one of the threaded studs protruding from an upper exterior surface of the body of the valve and held in place by a threaded nut. In some aspects, the method can include attaching the adapter plate to the circular disk by inserting a threaded bolt into a threaded bore on the distal end of each of the at least two downwardly disposed connectors. In further aspects, the method can include attaching the adapter plate to the blind flushing bonnet by inserting one of the at least two connectors through each of the at least two openings in the adapter plate, contacting the bottom side of the circular disk with an upper side of the adapter plate, and inserting an externally threaded end of at least one bolt through an opening in the adapter plate and threadably receiving said bolt in a threaded bore in the bottom of the circular disk.

In particular embodiments, a method of adjusting a flushing bonnet assembly, for use in a globe valve, from a first position to a second position can include providing a flushing bonnet assembly that includes a circular disk adapted to be received in an upper opening of an internal cavity of the valve. The flushing bonnet assembly can include at least two downwardly disposed connectors, each attached at a proximal end to the bottom side of the circular disk, an adapter plate removably attached to a distal end of the downwardly disposed connectors, at lest two downwardly disposed legs connected at a proximal end to a bottom side of the adapter plate, and a seat protection ring connected to a distal end of the one or more legs, wherein the seat protection ring can be adapted to be disposed in close proximity to a closure seat of the valve. The method can include removing the adapter plate attached to the circular disk by removing a threaded bolt from a threaded bore on the distal end of each of the at least two downwardly disposed connectors, rotating the adapter plate at least 90 degrees but less than 180 degrees, attaching the adapter plate to the circular disk by inserting the at least two connectors through at least two openings in the adapter plate, contacting the bottom side of the circular disk with an upper side of the adapter plate, and inserting an externally threaded end of at least one bolt through an opening in the adapter plate and threadably receiving said bolt in a threaded bore in the bottom of the circular disk.

DESCRIPTION OF DRAWINGS

FIG. 7 is a perspective view of a flushing bonnet assembly, in accordance with some embodiments.

FIG. 8 is a top view of the flushing bonnet assembly of FIG. 7.

FIG. 18 is a perspective view of the flushing bonnet assembly of FIG. 14 assembled in a second configuration.

FIG. 19 is an alternative perspective view of the assembled flushing bonnet assembly of FIG. 18.

Like reference symbols in the various drawings indicate like elements.

DETAILED DESCRIPTION OF ILLUSTRATIVE EMBODIMENTS

Figure 5:
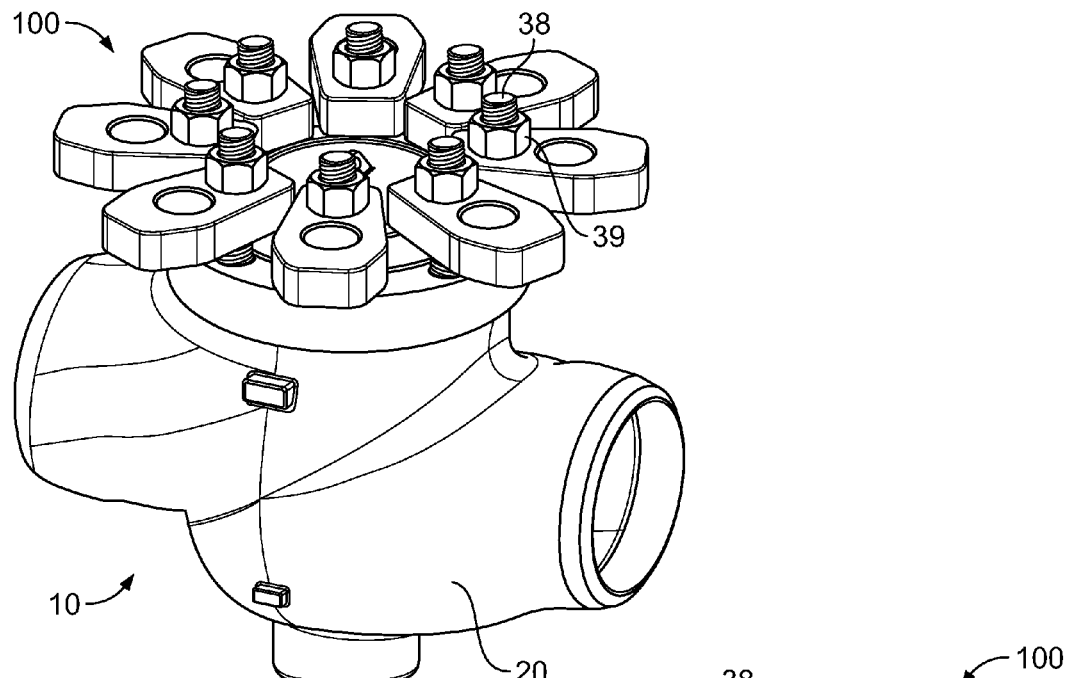
FIG. 5 is a perspective view of a valve flushing kit installed in a globe valve, in accordance with some embodiments.
Figure 6:
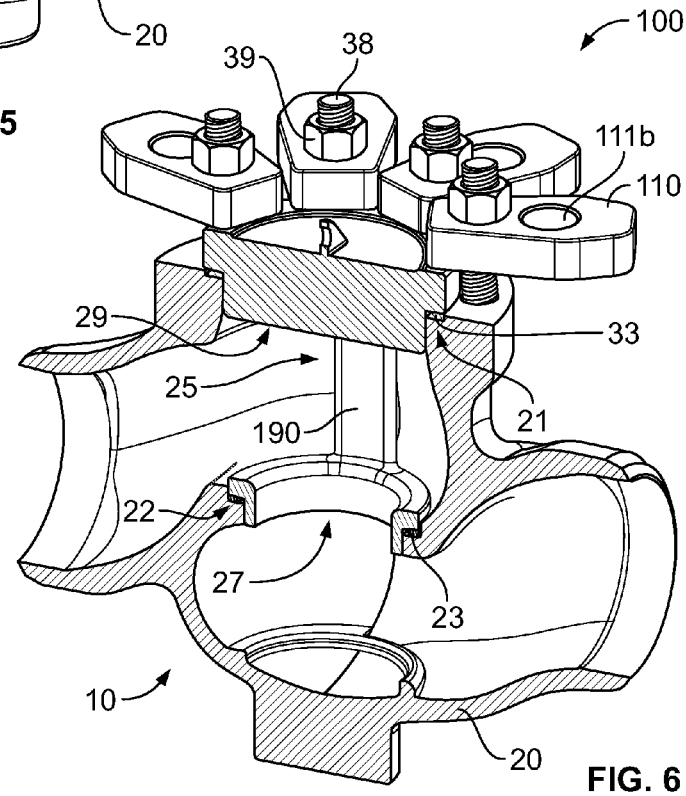
FIG. 6 is a cross-sectional view of the valve flushing kit and globe valve of FIG. 5.

Referring to FIGS. 5-7, some embodiments of a universal valve flushing kit 100 for use in flushing a globe valve (e.g., a globe valve 10) can include a flushing bonnet assembly 120 that can be installed in a prior art globe valve 10 in place of an actuator/bonnet assembly 30 (see FIG. 1) and critical internal valve components such as guiding, sealing and controlling surfaces referred to as "valve trim" 31 (see FIG. 1), when the globe valve 10 and associated piping system (not shown) is to be flushed. For example, when flushing a globe valve 10 and coupled inlet and outlet piping, contaminants within the piping can be forced through the valve 10, causing damage to internal components of the valve 10 such as the valve trim 31, a valve seat 22, and the like. When flushing the globe valve 10, some components such as the actuator/bonnet assembly 30 and the internal valve trim 31 (see FIG. 1 and explanation thereof) can be removed to protect them from damage while non-removable components, such as the valve seat 22, can be covered for protection. Advantageously, a valve flushing kit, such as the kit 100 that is universal in nature (e.g., can be used on multiple sizes of valves, valves with different nominal size and pressure ratings, and the like), can reduce the cost required to protect a globe valve 10 during a flushing procedure. For example, by providing a flushing kit 100 that is universal in nature, less inventory is required to flush a wide variety of globe valves. In another example, the flushing kit 100 can reduce the installation time by eliminating the need to fully disassemble the actuator/bonnet assembly 30 and valve trim 31 when it is removed from the valve for flushing operations. Furthermore, eliminating the full disassembly of the actuator/bonnet assembly and valve trim can reduce the risk of damage. By decreasing the time required for installation of the flushing kit 100 and decreasing the risk of damage to the globe valve 10, money can be saved, not only in parts and labor costs, but also in lost productivity while the valve and piping system to be flushed is out of service.

Figure 1:
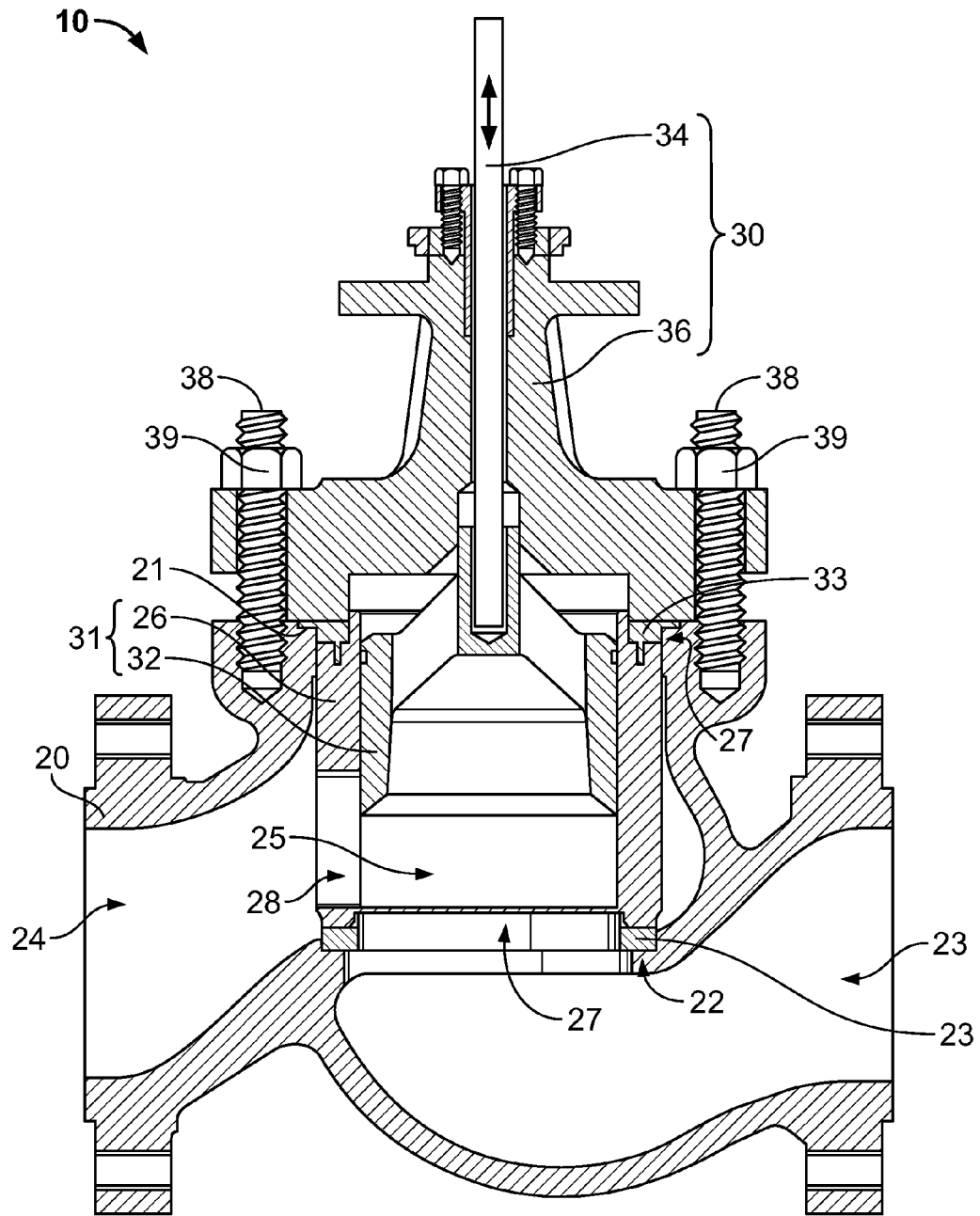
FIG. 1 is a cross-sectional view of a prior art globe valve.

Referring now to FIG. 1, a prior art globe valve 10 can include a valve body 20 that includes an inlet 23 in fluid communication with an outlet 24 and the actuator/bonnet assembly 30 secured to the valve body 20 using fasteners (e.g., bonnet studs 38 and bonnet nuts 39). The interior of valve body 20 can be contoured such that fluid flows smoothly between the inlet 23 and the outlet 24. While the valve 10 is described as having the inlet 23 and the outlet 24, fluid can flow in either direction between the inlet 23 and the outlet 24. An interior cavity 25 of the valve body 20 can include valve trim 31 which may include a throttling cage 26 that concentrically receives and guides a throttling plug 32 connected to the actuator/bonnet assembly 30. The plug 32 can be coupled to a reciprocating stem 34 that extends downward through a valve bonnet 36 into the cavity 25. The valve bonnet 36 can seal an upper opening 29 defined by a substantially circumferential edge 21. When the valve 10 is in the open configuration shown in FIG. 1, fluid can flow through an opening 27 defined by the substantially circumferential seat 22. Thus, as fluid enters through the inlet 23, fluid can flow up through the opening 27 and into the cage 26, through fluid ports 28, and out through the outlet 24.

The plug 32 can throttle flow through the cavity 25 by selectively covering a portion of the ports 28 thereby reducing the available area through which fluid can flow. Thus, the maximum flow through the valve 10 is achieved when the plug 32 is fully retracted (as depicted in FIG. 1) to cover the least, or no, amount of the flow ports 28. The valve 10 can be configured such that when the valve 10 is transitioned to a closed configuration, the plug 32 may seal to the flow ports 28 of the throttling cage 26 to stop substantially all of the flow into the throttling cage 26 and through the valve 10. The throttling cage 26 can also be sealed to the valve body 20, so that substantially all of the flow through the valve 10 passes through the throttling cage 26. In many embodiments, the seat 22 which is located at the bottom of the cavity 25 in the valve body 20, further includes a circumferential seat gasket 23 disposed on the seat to form a sealing surface that enables the plug 32 to seal with the seat 22.

As indicated in the background section, some piping systems require periodic maintenance wherein flushing of the system and attached valves is performed. For example, a portion of a piping system that includes one or more valves (e.g., the globe valve 10) may be drained and flushed, for example, as part of a regular maintenance program, prior to repair of a portion of that system, prior to repair or replacement of a valve, and/or after replacement of a valve or repair to the system in general. In such circumstances, flushing of the network may include flushing one or more of the globe valves 10 in the piping system. Since the globe valves 10 can include valve trim 31 components such as the plug 32 and cage 26 that require tight tolerances in order to function, these components may require protection from contaminants, such as solids dislodged during flushing of the network. For example, for the globe valve 10 to seal properly, manufactured tolerances between the plug 32, the cage 26, and the seat 22 must be maintained. When flushing a piping system, debris within the system can be forced at high pressure through the valves in the system. This debris can damage components of the globe valve 10, such as the plug 32, the cage 26, the seat 22, the interfaces between these components, and the like. In some examples, the globe valve 10 can be prepared prior to flushing such that the internal components of the valves are either removed or protected.

Figures 2, 3:
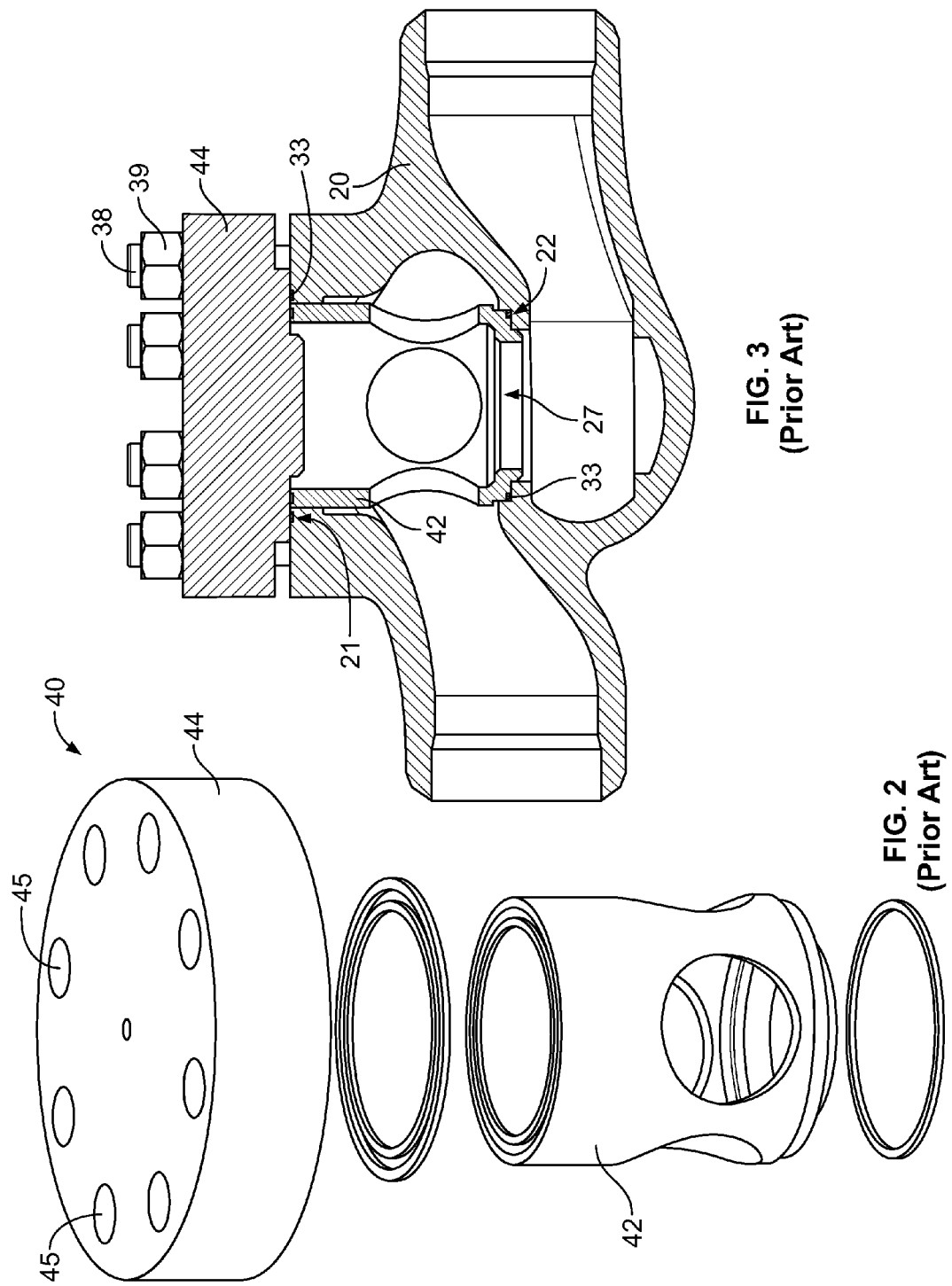
FIG. 2 is an exploded view of a prior art flushing cage and flushing bonnet.
FIG. 3 is cross-sectional view of the prior art flushing cage and bonnet of FIG. 2 installed in a prior art globe valve.

Referring now to FIGS. 2-3, some prior art embodiments of a valve flushing kit, such as a valve flushing kit 40 include a flushing cage 42 for protecting internal surfaces of a valve body 20 and a flushing bonnet 44 for sealing the upper opening 29 of the valve body 20 and maintaining the flushing cage 42 positioned within the valve body 20. In these embodiments, components of the globe valve 10 (e.g., the actuator/bonnet assembly 30, the valve trim 31 including the cage 26, the plug 32, and the like) can be removed from the globe valve and replaced with the flushing kit 40 prior to flushing the attached piping system. The flushing bonnet 44 includes openings 45 that can accept the bonnet studs 38 of the globe valve 10 and can be held in place by the nuts 39, thus creating a fluid tight seal with the edge 21. While the flushing bonnet 44 has openings 45 that correspond to the studs 38 in the valve 10 shown, different globe valves can have different sizes and configurations of bonnet studs, thus requiring different flushing bonnets. This requires a larger inventory of bonnets be kept on hand than in the case where the bonnet is universal (e.g., fits more than one configuration of bonnet studs).

Figure 4:
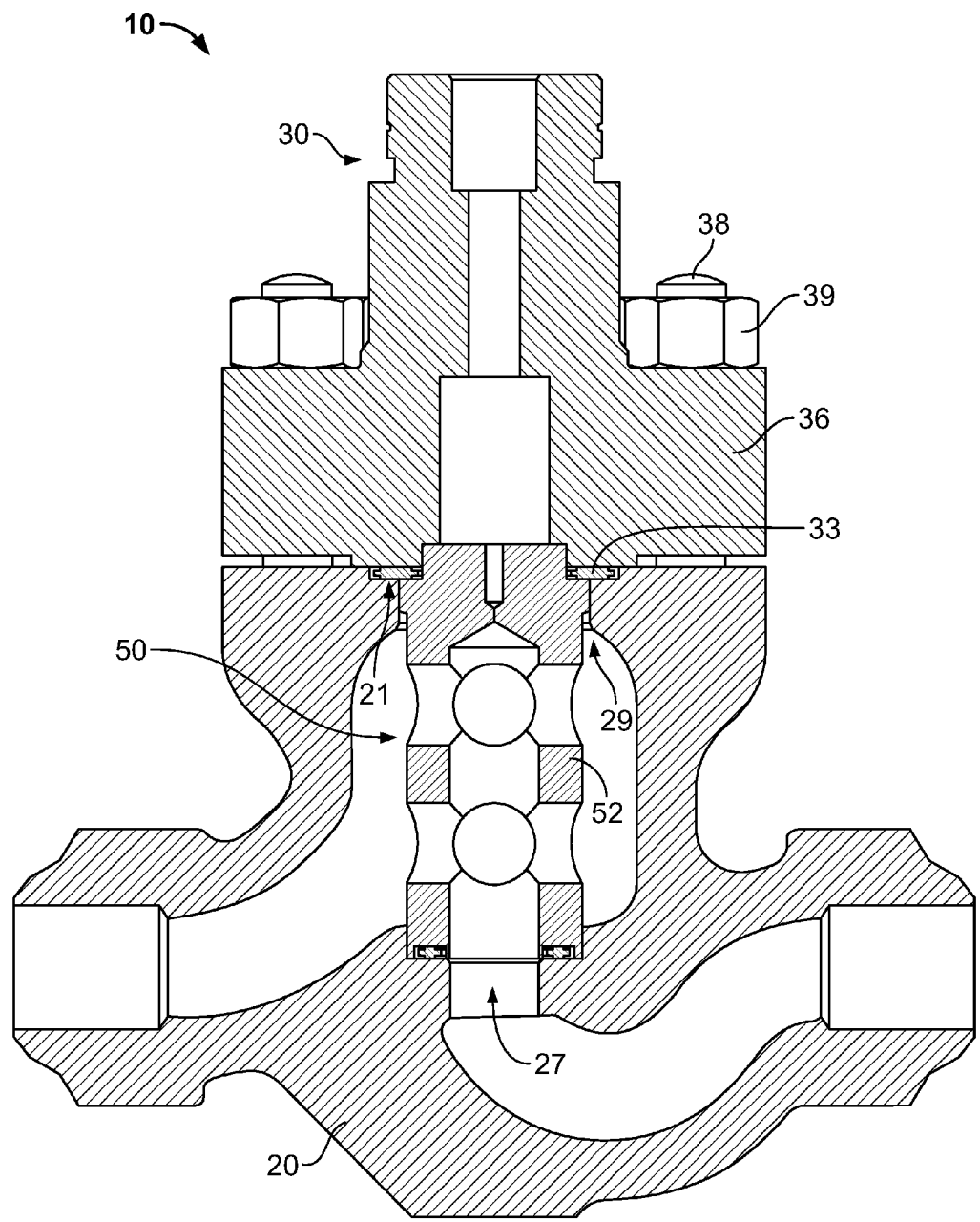
FIG. 4 is cross-sectional view of a prior art flushing cage installed in a prior art globe valve, wherein the valve bonnet assembly has been partially disassembled.

Referring now to FIGS. 1 and 4, some prior art embodiments of a valve flushing kit, such as the valve flushing kit 50 include a flushing cage 52 for protecting internal surfaces of a valve body, which can be held in place using the valve bonnet 36 of the globe valve 10. These embodiments can eliminate the need for a flushing bonnet as part of the valve flushing kit 50. In these embodiments, some of the valve trim 31 components of the globe valve 10 (e.g., the reciprocating stem 24, the cage 26, the plug 32, and the like) can be removed from the globe valve 10 and replaced with the flushing cage 52. However, in this example, the actuator/bonnet assembly 30 must be disassembled such that the valve bonnet 36 is separated from the remaining components of the actuator/bonnet assembly 30. The bonnet 36 and stem 34 are then reattached to the valve body 20 using the studs 38 and nuts 39 to hold the flushing cage in place and seal the opening 29. Upon completion of the flushing procedure, the actuator bonnet assembly 30 must be reassembled. These embodiments require additional time to disassemble and reassemble the actuator/bonnet assembly 30 (thus increasing labor costs) and increase the possibility of damage to the actuator/bonnet assembly 30, in many cases requiring new stem packing if a temporary stem plug is used.

Referring to FIGS. 1 and 5-7, in some embodiments, a new flushing kit 100 can be used for temporarily flushing a globe valve 10, the valve 10 having a valve body 20 defining the internal cavity 25 for receiving a linear reciprocating closure member (e.g., the throttling plug 32, cage 26 and the reciprocating stem 34). The valve body 20 can include the valve inlet 23 fluidly connected to the internal cavity 25 which is fluidly connected to the valve outlet 24. The valve body 20 can include the upper opening 29 in the internal cavity 25 which in normal operation of the valve and piping system can be substantially sealed by the actuator/bonnet assembly 30 (e.g., the bonnet 36 included in the actuator/bonnet assembly 30, and the like). The bonnet 36 can be held in place with one or more threaded nuts 39 each received on a plurality of threaded studs 38 protruding from an upper exterior surface of the valve body 20. The lower opening 27 in the internal cavity 25 can be circumferentially surrounded by the closure seat 22 that is adapted to receive a closure member, such as the plug 32 (see FIG. 1).

Referring now to FIGS. 5-12, in some embodiments, the valve flushing kit 100 can include the flushing bonnet assembly 120, configured with a circular shaped blind cover portion 140 that can be at least partially received in the upper opening 29 of the internal cavity 25 such that when coupled to the valve body 20 (e.g., using the nuts 39, the studs 38, and clamps 110) a substantially fluid-tight seal is maintained between one or more outer edges of the blind cover portion 140 and the substantially circumferential edge 21 of the valve body that defines the upper opening 29. When installed in this manner, a seat protection ring 170 included in the flushing bonnet assembly 120 can abut seat gasket 23 or be disposed in close proximity thereto and protect the closure seat 22. The flushing bonnet assembly 120 can be positioned within the valve body 20 in this manner when the actuator/bonnet assembly 30 and valve trim 31 is removed. The flushing bonnet assembly 120 can include one or more downwardly disposed legs 190 such that proximal ends 192 of the legs 190 are coupled to a bottom side 141 of the blind bonnet portion 140 and that distal ends 194 of the legs 190 are coupled to the seat protection ring 170 adapted to contact the seat gasket 23 or be disposed in close proximity thereto. The valve flushing kit 100 can include one or more of the bonnet clamps 110 each having at least one opening 111a (see FIG. 11) therethrough, wherein the opening 111a can be adapted to be received on one of the threaded studs 38 protruding from the upper exterior surface of the valve body 20 and held in place by one of the threaded nuts 39. In some embodiments, the bonnet clamps 110 can each include the opening 111a and an opening 111b of a different size than the opening 111a. In these embodiments, one set of the clamps 110 can be used on valves that include different sized studs 38 (including an acceptable tolerance between the opening and the outer diameter of the stud). The flushing bonnet assembly 120 can include a handle 118 to assist in inserting and removing the flushing assembly 120 from a valve (e.g., the valve body 20).

Briefly, in use, the piping system (not shown) coupled to the globe valve 10 can require flushing (e.g., to remove debris, prior to repair, prior to inspection, and the like). When flushing the piping system, it can be advantageous to remove the actuator/bonnet assembly 30 (see FIG. 1) and valve trim 31 and to protect the seat 22 from damage related to flushing the system. The actuator/bonnet assembly 30 (including the plug 32, the reciprocating stem 34, and the like) and subsequently the valve trim 31 (including the plug 32 and cage 26) can be removed by first removing the nuts 39 and then separating the actuator/bonnet assembly 30 from the valve body 20. The some or all of the elements of the valve trim 31 are removed. With the actuator bonnet assembly 30 removed and the plug 32 and cage 26 removed, the internal cavity 25 is now fluidly connected to the exterior of the valve body 20 via the upper opening 29. The valve flushing kit 100 can be used to create a substantially fluid-tight seal with the edge 21, thus fluidly disconnecting the internal cavity 25 from the exterior of the valve body 20. For example, the flushing bonnet assembly 120 can be positioned such that the blind bonnet portion 140 abuts the edge 21 and the seat protection ring 170 abuts the seat gasket 23 or be disposed in close proximity thereto to protect seat 22. The flushing bonnet assembly 120 can then be secured in place using the bonnet clamps 110 held with the nuts 39, thus crushing the body gasket 33 and creating a tight seal. Once secured in this manner, the fluid system (including the interior of the globe valve 10), can be flushed, without concern for damaging delicate components such as the plug 32 and the cage 26 (which have been removed), the seat 22 (which is protected with the cover ring 170) and the like.

Figure 9:
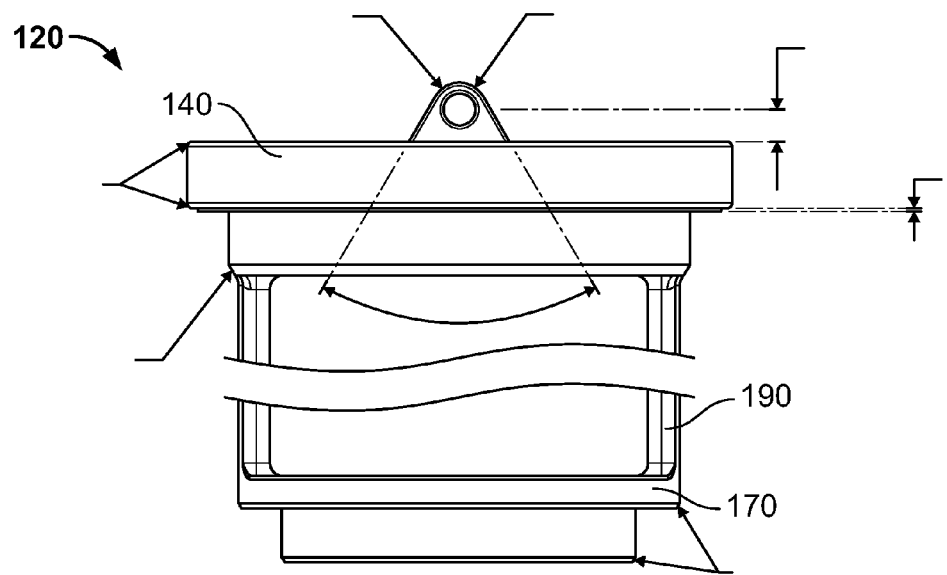
FIG. 9 is a side view of the flushing bonnet assembly of FIG. 7.
Figure 10:
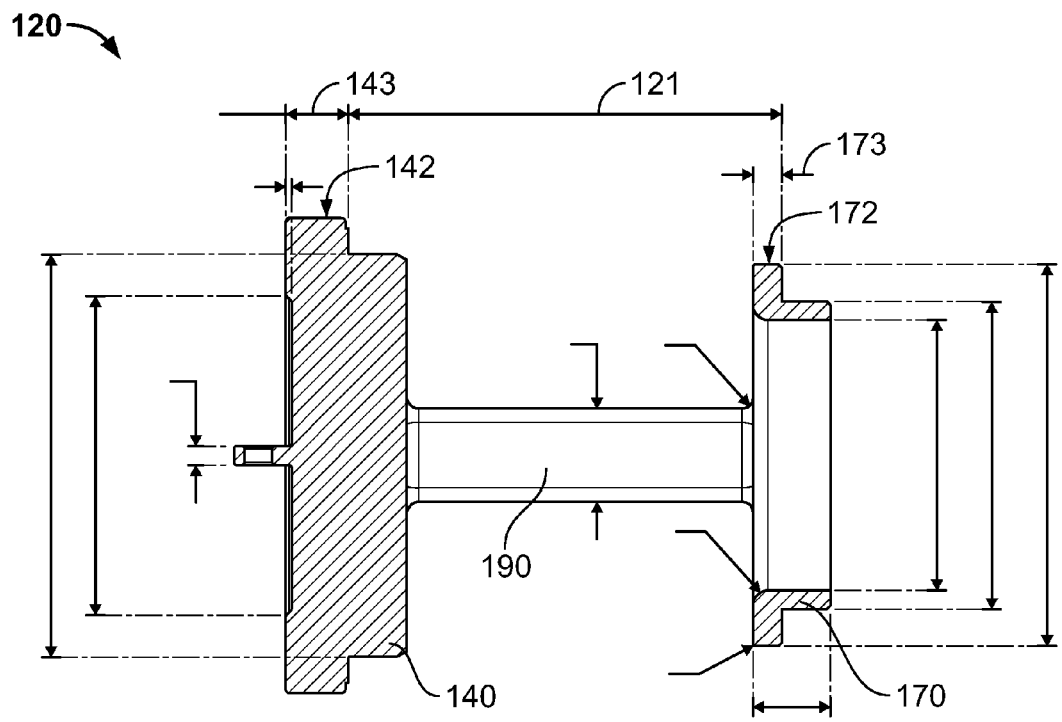
FIG. 10 is a cross-sectional view of the flushing bonnet assembly of FIG. 7.

Referring now to FIGS. 8-10, by way of a specific example, the flushing bonnet assembly 120 can include dimensions that can advantageously allow the valve flush kit 100 to be used with a 6 inch nominal size valve with a nominal pressure rating of 300 # ANSI globe valve, such as the globe valve 10 depicted in FIGS. 6-10. For example, the blind bonnet portion 140 of the assembly 120 can include a shoulder 142 with an exemplary thickness 143 of about 1.30 inches and the protection ring 170 can include a shoulder 172 with an exemplary thickness 173 of about 0.60 inches. In some embodiments, a distance 121 between a base of the shoulder 142 and a base of the shoulder 172 of about 9.05 inches, with a tolerance of 0.020 inches.

Figures 11, 12:
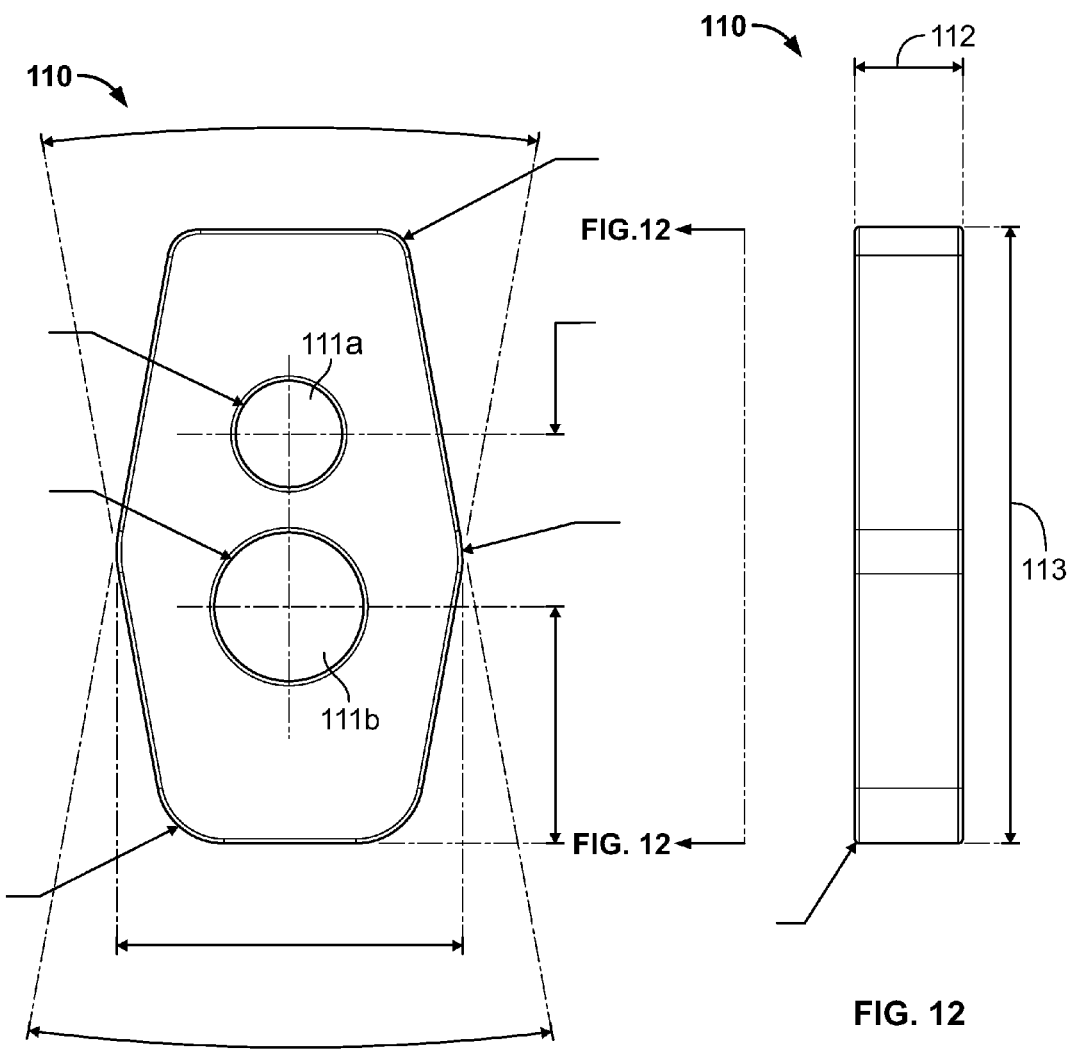
FIG. 11 is a top view of a flushing bonnet clamp, in accordance with some embodiments.
FIG. 12 is a side view of the flushing bonnet clamp of FIG. 11.
Figure 13:
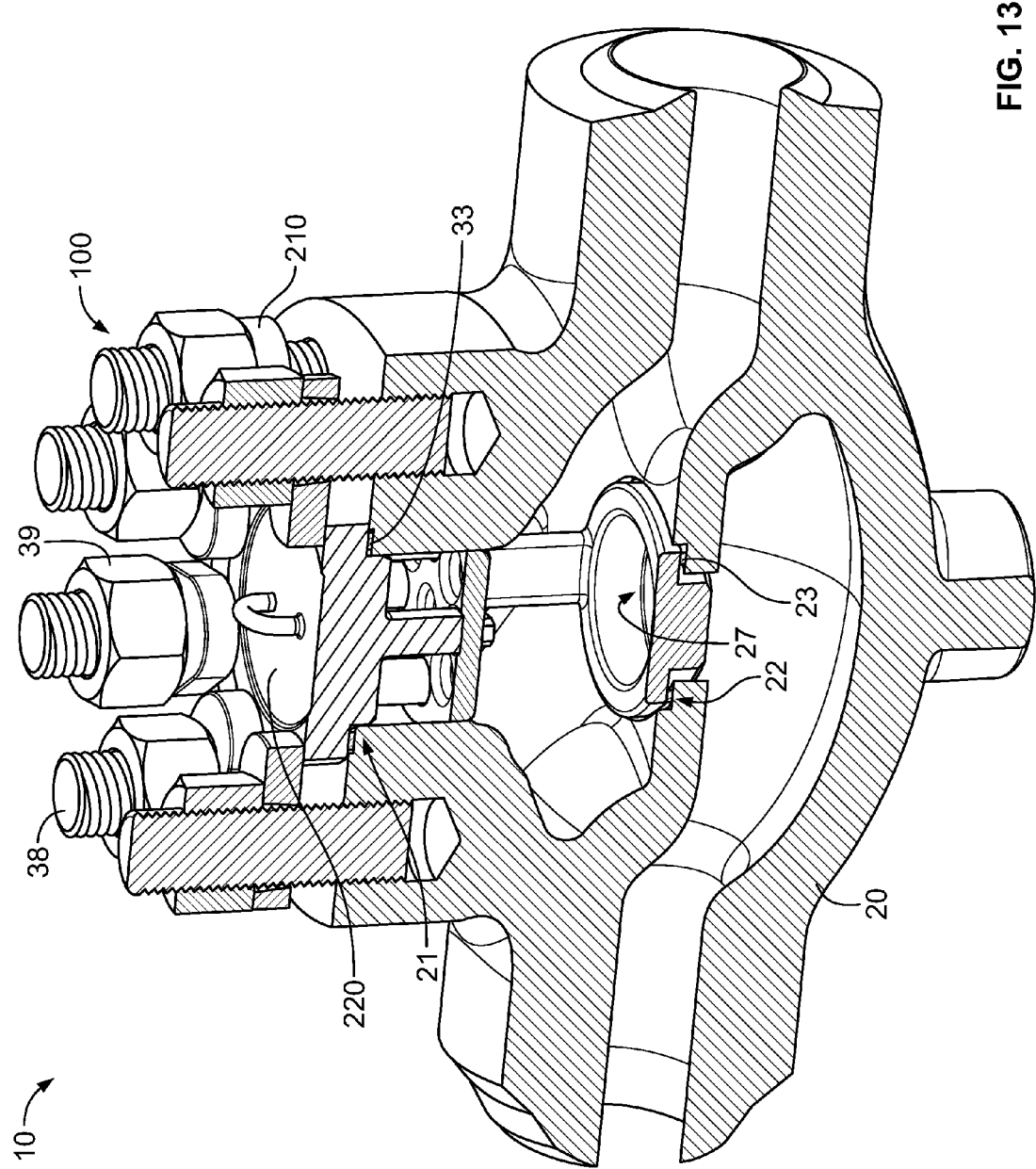
FIG. 13 is a cross-sectional view of a valve flushing kit installed in a globe valve, in accordance with alternative embodiments.
Figure 15:
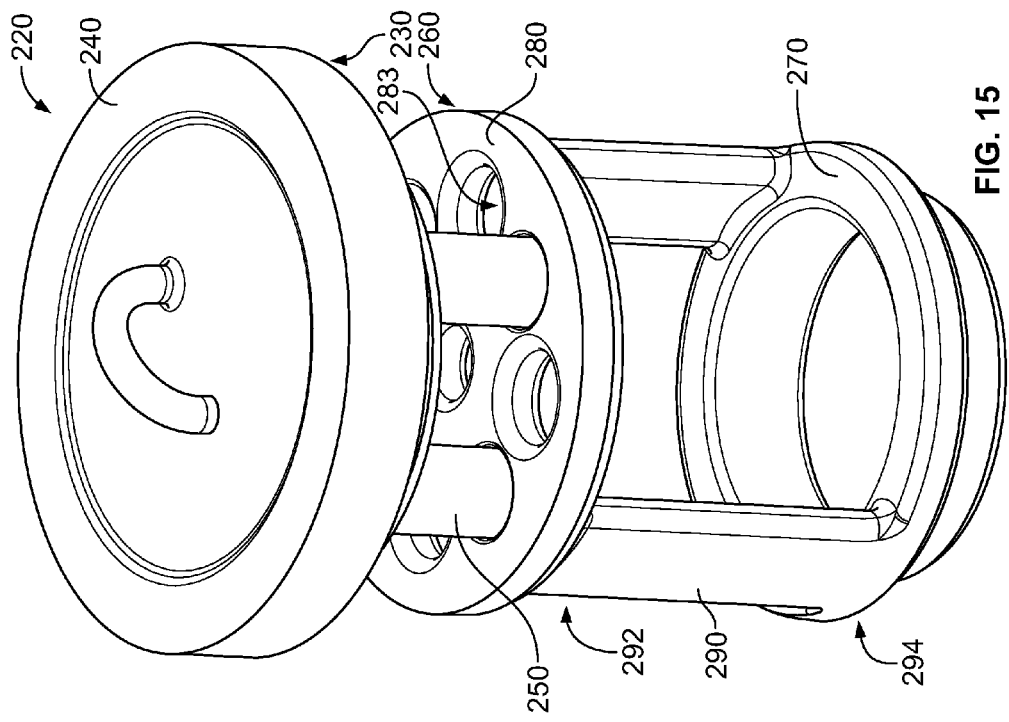
FIG. 15 is a perspective view of the flushing bonnet assembly of FIG. 14 assembled in a first configuration.
Figure 14:
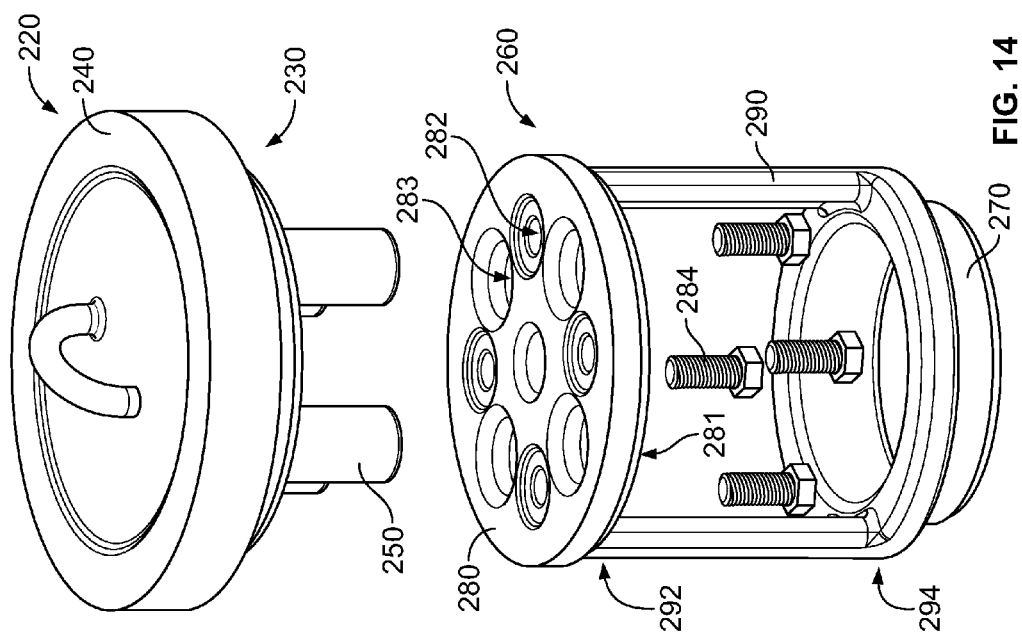
FIG. 14 is an exploded view of a flushing bonnet assembly, in accordance with alternative embodiments.
Figure 16:
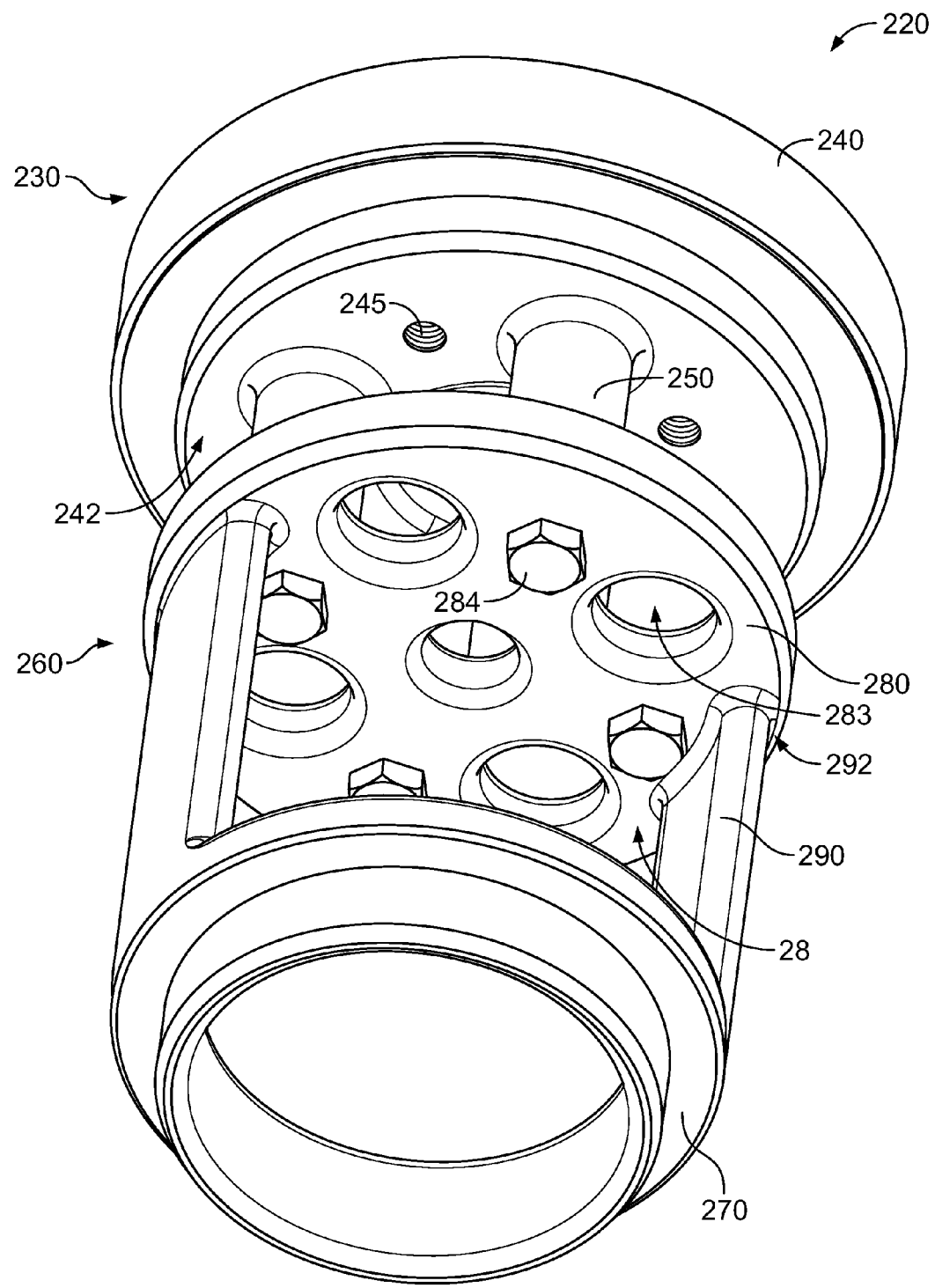
FIG. 16 is an alternative perspective view of the assembled flushing bonnet assembly of FIG. 15.

Referring now, by way of a specific example, to FIGS. 11-12, the clamp 110 can have a thickness 112 that is about 1.25 inches and a length 113 that is about 7.30 inches. As described previously, the clamp 110 can include one or more openings through the body of the clamp 110 (e.g., the openings 111a and 111b depicted). In some embodiments, the opening 111a can have a diameter of about 1.26 inches, while the opening 111b can have a diameter of about 1.76 inches.

Referring now to FIGS. 13-19, the valve flush kit 100 can include a different configuration of the flushing bonnet assembly. In one such alternate embodiment, the flush kit 100 can include a flushing bonnet assembly 220 that advantageously includes two or more components that can be reversibly coupled together. For example, the flushing bonnet assembly 220 can include an upper portion 230 and a lower portion 260 that can be rotated 90 degrees and coupled together. When installed in a globe valve, the upper portion 230 can seal the upper opening in the valve body (e.g., the upper opening 29 in the valve body 20) while the lower portion 260 can cover the seat gasket 23 or be disposed in close proximity thereto to protect the seat 22. In some embodiments, the flushing bonnet assembly 220 can be advantageously configured such that the upper portion 230 and the lower portion 260 can be coupled in more than one configuration, thus yielding a flushing bonnet assembly 220 that, when assembled, can have different distances between a blind cover portion 240 and a seat protection ring 270. Furthermore, in cases where the upper portion 230 and the lower portion 260 can be reversibly coupled, combinations of upper portions and lower portions can be assembled for use in a variety of valves that have, for example, different upper opening 29 diameters, different seat 22 diameters, different distances between the upper opening 29 and the seat 22, and the like. By giving technicians the ability to mix and match combinations of upper portions 230 and lower portion 260, the inventory of flushing bonnet assemblies can be reduced.

In some embodiments, the upper portion 230 of the flushing bonnet assembly 220 can include the generally disk shaped blind cover portion 240 that can seal the upper opening 29 of the valve body 20. The upper portion 230 can include features that can be rotated 90 degrees and couple the upper portion 230 to the lower portion 260. For example, the blind cover portion 240 can include one or more threaded openings 245 (see FIG. 16) and the upper portion 230 can include one or more connector shafts 250 extending axially downward from a bottom edge 242 (see FIG. 16) of the cover portion 240. The lower portion 260 can include complimentary features that can be rotated 90 degrees and couple the upper portion 230 to the lower portion 260. For example, the lower portion 260 can include an adapter disk 280 that includes one or more openings 282 that can accept screws 284 and one or more openings 283 that can accept the connector shafts 250. The connector shafts may be cylindrical rods (as shown) or alternative configurations As will be described in greater detail below, the screws 284 can be used in combination with the openings 282, the threaded openings 245, the connector shafts 250, and the like, to in an alternative manner couple the upper portion 230 to the lower portion 260. The lower portion 260 can include one or more downwardly disposed legs 290 such that proximal ends 292 of the legs 290 are coupled to a bottom side 281 of the adapter disk 280 and that distal ends 294 of the legs 290 are coupled to the seat protection ring 270 adapted to contact seat gasket 23 or be disposed in close proximity thereto and protect the closure seat 22.

Referring now to FIGS. 13-16, as described previously, the upper portion 230 and the lower portion 260 can be coupled in more than one configuration, thus yielding a flushing bonnet assembly 220 that, when assembled, can have different distances between the blind cover portion 240 and the seat protection ring 270. For example, the adapter disk 280 can include the openings 282 that can abut the connector shafts 250 from the upper portion 230. When the internal threads of the connector shafts 250 are aligned with the openings 282, the upper portion 230 can be reversibly coupled to the lower portion 260 using, for example, the bolts 284. In this example, threaded shafts of the bolts 284 can pass through the openings 282 and engage the internal threads of the connector shafts 250. When the bolts 284 are secured, the flushing bonnet assembly 220 becomes substantially rigid and can be installed in a globe valve 10 prior to flushing.

Figure 17:
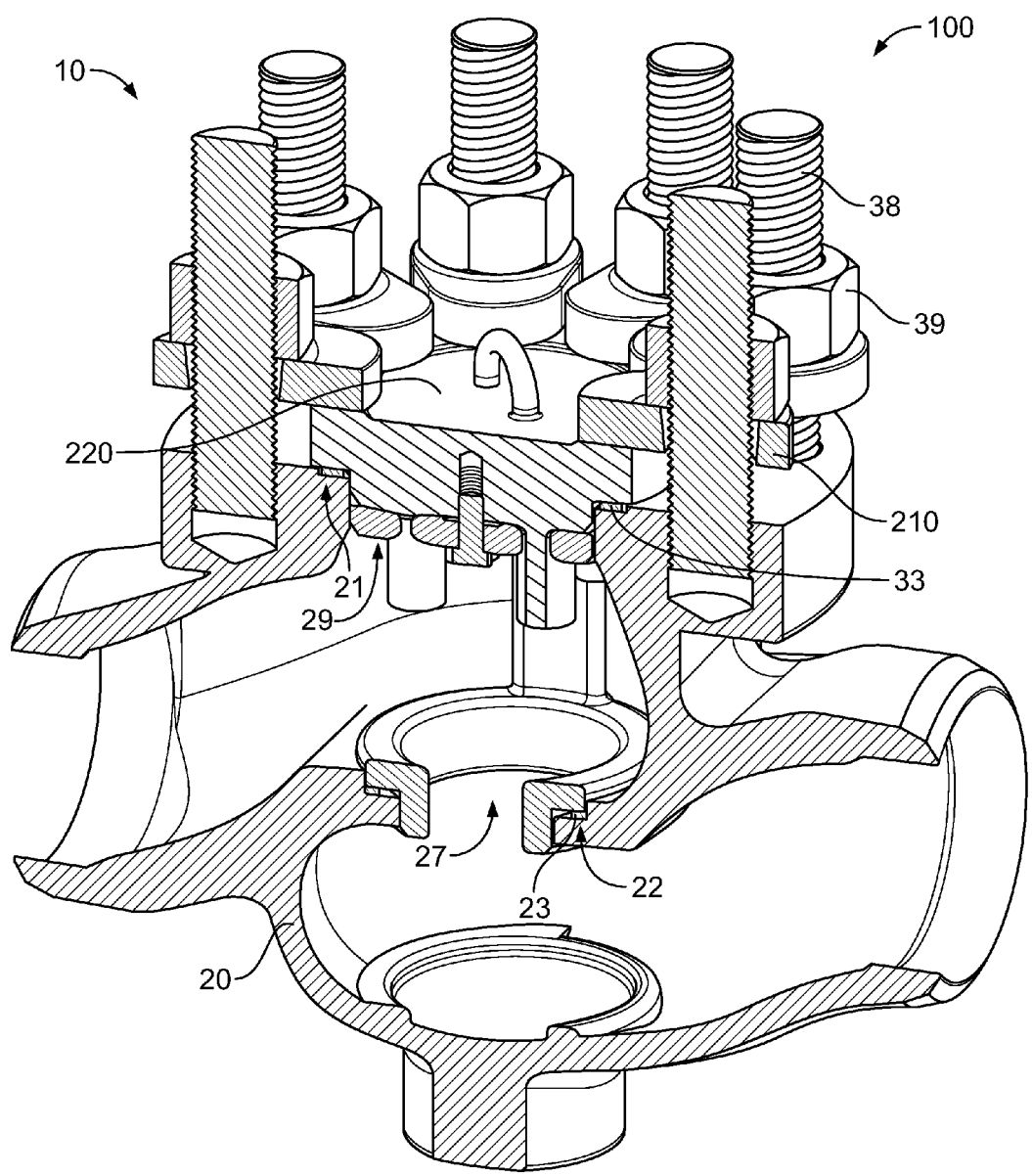
FIG. 17 is a cross-sectional view of the flushing bonnet assembly of FIG. 14 assembled in a second configuration and installed in a globe valve.

Referring now to FIGS. 17-19, in another example, the upper portion 230 can be positioned such that the connector shafts 250 pass through the openings 283 until the blind cover portion 240 abuts the adapter disk 280. When in this configuration, the threaded openings 245 can be aligned with the openings 282 such that the bolts 284 can pass through the openings 282 and engage the internal threads of the openings 245, thus reversibly coupling the upper portion 230 to the lower portion 260. In this configuration, the distance between the cover portion 240 and the protection ring 270 can be smaller than in the configuration described previously where the portions 230 and 260 are secured using the connector shafts 250. This advantageously allows one upper portion 230 and one lower portion 260 to be assembled in at least two different lengths, helping to reduce the inventory of flushing bonnet assemblies needed for use in flushing a variety of globe valves. As with previous embodiments, the valve flushing kit 100 can include one or more bonnet clamps 210 that can be positioned on the threaded studs 38 and held in place by one of the threaded nuts 39 to secure the blind bonnet 220 to the valve body 20.

Figure 20:
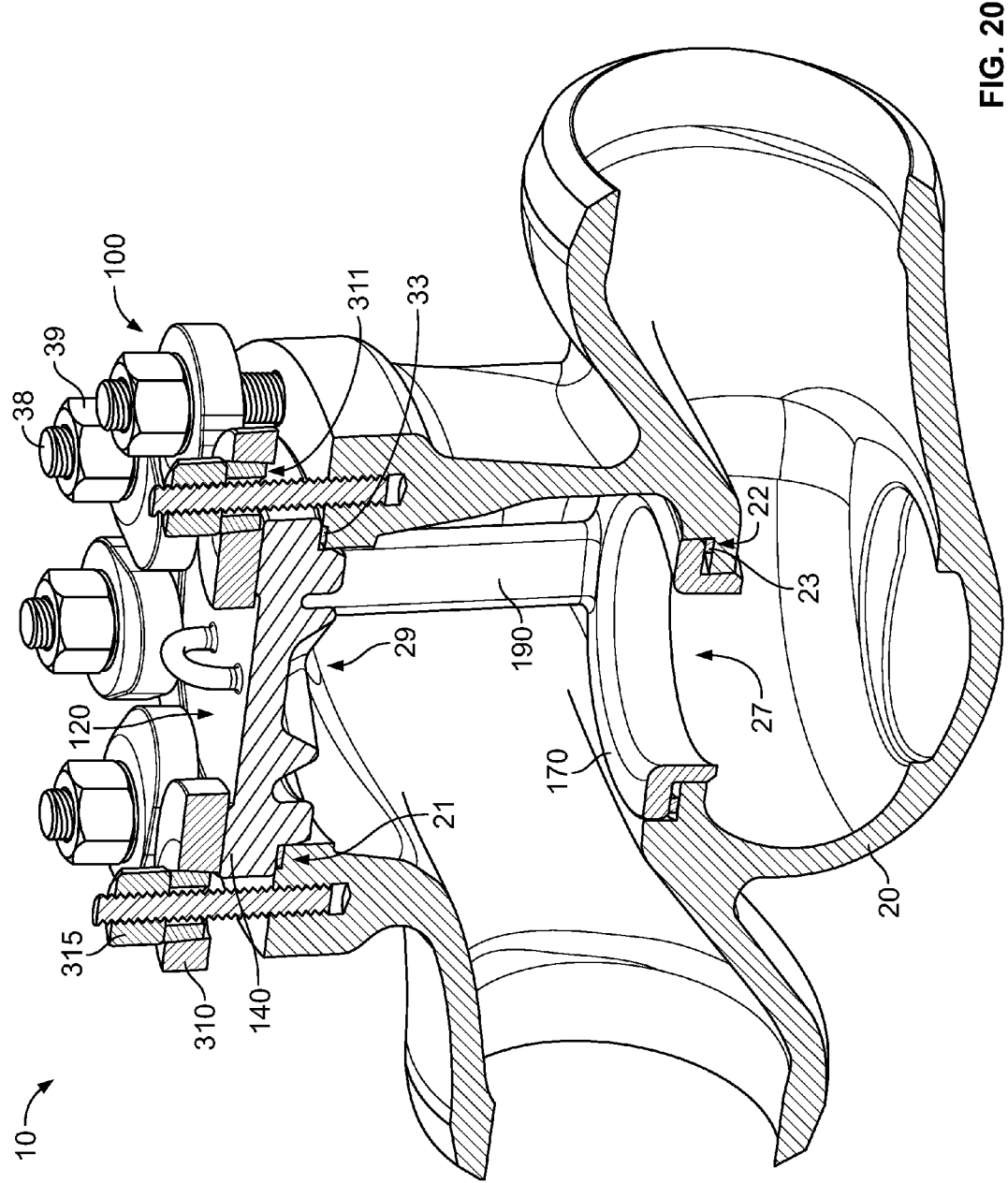
FIG. 20 is a cross-sectional view of a valve flushing kit installed in a globe valve, wherein the valve flushing kit includes clamp bushings to secure the flushing bonnet assembly, in accordance with some embodiments.

Referring now to FIGS. 1 and 20, in some alternative embodiments, the flushing kit 100 can include bushings 315 for use with bonnet clamps 310. The clamps 310 can include openings 311 configured to accept the bonnet studs 38 of the globe valve 10. For example, the bushings 315 can be configured such that the inside diameter of the bushings 315 are the size of the outside diameter of the studs 38 plus an allowed tolerance, such that the bushings 315 can slide over the studs 38. Furthermore, the bushings 315 can include a conical outside diameter that is tapered from a size that is smaller than the openings 311 to a size that is larger than the openings 311. As in previous examples, the flushing bonnet assembly 120 and 220 can be positioned inside the globe valve 10 in place of internal components such as the cage 26, the plug 32, and the like, such that the flushing bonnet assembly can cover and protect the seat 22 and seal the upper opening 29. To secure the flushing bonnet assembly in place, the bonnet clamps 310 can be positioned such that the bonnet studs 38 pass through the openings 311. The bushings 315 can then be positioned over the studs 38 such that the smaller diameter ends enter the openings 311. The bushings 315 will slide down the studs 38 until the tapered outer diameters contact substantially the entire circumference of openings 311. When the nuts 39 are tightened on the studs 38, this action causes the studs 38 to contact the bushings 315 and forces the bushings 315 farther into the openings 311, creating a wedging force. This force can cause the clamps 310 to secure the flushing bonnet assembly in the globe valve 10. In this example, the nuts 39 can advantageously be used to secure the clamps 310 in place by contacting the bushings 315 and not the clamps 310 themselves, thus it is not required that the nuts 39 be larger than the openings 311. In these embodiments, the clamps 310 can include a single opening 311, but can be used with studs 38 with a wide range of diameters.

In examples where the nuts 39 are larger than the openings 311, the bushings 315 may not be needed and the nuts 39 can be tightened directly to the clamps 310. In examples where the nuts 39 are smaller than the openings 311, the bushings 315 can be used as described above. In some embodiments, the valve flushing kit 100 can include bushings 315 with different sized inside diameters for use with different sized bonnet studs. In these embodiments, the flushing kit 100 can advantageously be used with a variety of globe valves that each includes different sized bonnet studs. When using the clamps 310 with different sized studs than those depicted in FIG. 20, bushings 315 are chosen from the kit that include inside diameters that substantially match the outside diameters of the bonnet studs 38. In some embodiments, one set of bushings 315 can be used on a variety of sizes of studs 38.

A number of embodiments of the invention have been described. Nevertheless, it will be understood that various modifications may be made without departing from the spirit and scope of the invention. Accordingly, other embodiments are within the scope of the following claims.

What is claimed is:

1. A flushing kit used for temporarily flushing a globe valve, said valve having a valve body defining an internal cavity for receiving a linear reciprocating closure member and a first internal fluid passage connecting a valve inlet to the internal cavity and a second internal fluid passage connecting the internal cavity to a valve outlet, said internal cavity having an upper opening closed by a closure bonnet held in place with threaded nuts received on a plurality of threaded studs protruding from an upper exterior surface of the valve body, and a lower opening in the internal cavity having a closure seat and a seat gasket adapted to receive the closure member, said flushing kit comprising:
 a flushing bonnet assembly comprising a circular disk adapted to be received in the upper opening of the valve cavity when the closure bonnet and the closure member are removed;
 one or more downwardly disposed legs connected at a proximal end to a bottom side of the circular disk;
 a seat protection ring adapted to abut the seat gasket and thereby protect the closure seat, said seat protection ring connected to a distal end of the one or more legs; and
 a plurality of bonnet clamps each having at least one opening therethrough, said opening adapted to be received on one of the threaded studs protruding from the upper exterior surface of the valve body and held in place by the threaded nuts.

2. The flushing kit of claim 1 further including a plurality of bushings each having an exterior diameter sized to be received in the opening of each of the bonnet clamps and having an internal diameter of sized to be received on the threaded studs protruding from the upper exterior surface of the valve body.

3. The flushing kit of claim 1 wherein each of the bonnet clamps has two or more holes of varying diameters wherein at least one of the diameters is sized to be received on the threaded studs protruding from the upper exterior surface of the valve body.

4. The flushing kit of claim 3 further including a plurality of bushings each having an exterior diameter sized to be received in at least one of the openings of each of the bonnet clamps and having an internal diameter sized to be received on the threaded studs protruding from the upper exterior surface of the valve body.

5. A flushing kit used for temporarily flushing a globe valve, said valve having a valve body defining an internal cavity for receiving a linear reciprocating closure member and a first internal fluid passage connecting a valve inlet to the internal cavity and a second internal fluid passage connecting the internal cavity to a valve outlet, said internal cavity having an upper opening closed by a closure bonnet held in place with threaded nuts received on a plurality of threaded studs protruding from an upper exterior surface of the valve body, and a lower opening in the internal cavity having a closure seat and a seat gasket adapted to receive the closure member, said flushing kit comprising:
 a flushing bonnet assembly comprising a circular disk adapted to be received in the upper opening of the valve cavity when the closure bonnet and the closure member are removed;
 at least two downwardly disposed connectors, each attached at a proximal end to a bottom side of the circular disk;
 an adapter plate configured to receive a distal end of the connectors and be attached thereto;
 one or more downwardly disposed legs connected at a proximal end to a bottom side of the adapter plate;
 a seat protection ring adapted to abut the closure seat gasket and thereby protect the closure seat, said seat, protection ring connected to a distal end of the one or more legs; and
 a plurality of bonnet clamps each having at least one opening therethrough, said opening adapted to be received on one of the threaded studs protruding from the upper exterior surface of the valve body and held in place by the threaded nuts.

6. The flushing kit of claim 5 wherein the at least two downwardly disposed connectors have a bore on each of their distal ends with internal threads therein and the adapter plate is connected to the downwardly disposed connectors with a threaded bolt received in the threaded bore on the end of each of the downwardly disposed connectors.

7. The flushing kit of claim 6 wherein the adapter plate includes at least two recesses adapted to receive the distal ends of the at least two downwardly disposed connectors.

8. The flushing kit of claim 5 wherein the adapter plate includes at least two openings sized to allow one of the downwardly disposed connectors to pass through each opening and allow the bottom side of the blind flushing bonnet to contact an upper side of the adapter plate.

9. The flushing kit of claim 8 wherein the adapter plate further includes at least two additional openings each sized to allow a threaded end of a bolt to pass therethrough, wherein said bolt is received in a threaded bore in the bottom of the circular disk.

10. The flushing kit of claim 5 further including a plurality of bushings each having an exterior diameter sized to be received in the opening of each of the bonnet clamps and having an internal diameter of sized to be received on the threaded studs protruding from the upper exterior surface of the valve body.

11. The flushing kit of claim 5 wherein each of the bonnet clamps has two or more holes of varying diameters wherein at least one of the diameters is sized to be received on the threaded studs protruding from the upper exterior surface of the valve body.

12. The flushing kit of claim 11 further including a plurality of bushings each having a exterior diameter sized to be received in at least one of the openings of each of the bonnet clamps and having an internal diameter sized to be received on the threaded studs protruding from the upper exterior surface of the valve body.

13. A flushing bonnet assembly used for temporarily flushing a globe valve, said valve having a valve body defining an internal cavity for receiving a linear reciprocating closure member and a first internal fluid passage connecting a valve inlet to the internal cavity and a second internal fluid passage connecting the internal cavity to a valve outlet, said internal cavity having an upper opening closed by a closure bonnet held in place with threaded nuts received on a plurality of threaded studs protruding from an upper exterior surface of the valve body, and a lower opening in the internal cavity having a closure seat and a seat gasket adapted to receive the closure member, said flushing bonnet assembly comprising:
 a circular disk adapted to be received in the upper opening of the valve cavity when the closure bonnet and the closure member are removed;
 one or more downwardly disposed legs connected at a proximal end to a bottom side of the circular disk; and a seat protection ring adapted to abut the seat gasket, said seat protection ring connected to a distal end of the one or more legs.

14. A flushing bonnet assembly used for temporarily flushing a globe valve, said valve having a valve body defining an internal cavity for receiving a linear reciprocating closure member and a first internal fluid passage connecting a valve inlet to the internal cavity and second internal fluid passage connecting the internal cavity to a valve outlet, said internal cavity having an upper opening closed by a closure bonnet held in place with threaded nuts received on a plurality of threaded studs protruding from an upper exterior surface of the valve body, and a lower opening in the internal cavity having a closure seat and a seat gasket adapted to receive the closure member, said flushing bonnet assembly comprising:
a circular disk adapted to be received in the upper opening of the valve cavity when the closure bonnet and the closure member are removed;
at least two downwardly disposed connectors, each attached at a proximal end to a bottom side of the circular disk;
an adapter plate configured to receive a distal end of the connectors and be attached thereto;
one or more downwardly disposed legs connected at a proximal end to a bottom side of the adapter plate; and
a seat protection ring adapted to abut the seat gasket, said seat protection ring connected to a distal end of the one or more legs.

15. The flushing bonnet assembly of claim 14 wherein the at least two downwardly disposed connectors each have a threaded bore on each of their distal ends with internal threads therein and the adapter plate is connected to the downwardly disposed connectors with a threaded bolt received in the threaded bore on the end of each of the downwardly disposed connectors.

16. The flushing bonnet assembly of claim 15 wherein the adapter plate includes at least two recesses adapted to receive the distal ends of the at least two downwardly disposed connectors.

17. The flushing bonnet assembly of claim 14 wherein the adapter plate includes at least two openings sized to allow one of the downwardly disposed connectors to pass through each opening and allow the bottom side of the blind flushing bonnet to contact an upper side of the adapter plate.

18. The flushing adapter of claim 17 wherein the adapter plate further includes at least two additional openings each sized to allow a threaded end of a bolt to pass therethrough, wherein said bolt is received in a threaded bore in the bottom of the blind flushing bonnet.

19. A method of using a flushing kit for temporarily flushing a globe valve, said valve having a valve body defining an internal cavity for receiving a linear reciprocating closure member and a first internal fluid passage connecting a valve inlet to the internal cavity and a second internal fluid passage connecting the internal cavity to a valve outlet, said internal cavity having an upper opening closed by a closure bonnet held in place with threaded nuts received on a plurality of threaded studs protruding from an upper exterior surface of the valve body, and a lower opening in the internal cavity having a closure seat adapted to receive the closure member, said method comprising:
removing the valve closure bonnet;
removing the closure member;
installing a flushing bonnet assembly in the upper opening of the valve cavity, said flushing bonnet assembly comprising: a circular disk adapted to be received in the upper opening of a valve cavity, said flushing bonnet assembly further including one or more downwardly disposed legs connected at a proximal end to a bottom side of the circular disk, and a seat protection ring connected to a distal end of the one or more legs, said seat protection ring being adapted to abut the closure seat; and
installing a plurality of bonnet clamps each having at least one opening therethrough, said opening adapted to be received on one of the threaded studs protruding from the upper exterior surface of the valve body and held in place by the threaded nuts.

20. The method of claim 19 further including inserting a plurality of bushings each having a exterior diameter sized to be received in at least one of the openings of each of the bonnet clamps and having an internal diameter sized to be received on the threaded studs protruding from the upper exterior surface of the valve body.

21. A method of using a flushing kit for temporarily flushing a globe valve, said valve having a valve body defining an internal cavity for receiving a linear reciprocating closure member and a first internal fluid passage connecting a valve inlet to the internal cavity and a second internal fluid passage connecting the internal cavity to a valve outlet, said internal cavity having an upper opening closed by a closure bonnet held in place with threaded nuts received on a plurality of threaded studs protruding from an upper exterior surface of the valve body, and a lower opening in the internal cavity having a closure seat adapted to receive the closure member, said method comprising:
removing the valve closure bonnet;
removing the closure member;
installing a flushing bonnet assembly in the upper opening of the valve cavity, said flushing bonnet assembly comprising a circular disk adapted to be received in the upper opening of the valve cavity, said flushing bonnet assembly further including at least two downwardly disposed connectors, each attached at a proximal end to a bottom side of the circular disk, an adapter plate configured to receive a distal end of the connectors and be attached thereto, one or more downwardly disposed legs connected at a proximal end to a bottom side of the adapter plate, and a seat protection ring connected to a distal end of the one or more legs, said seat protection ring being adapted to abut the closure seat; and
installing a plurality of bonnet clamps each having at least one opening therethrough, said opening adapted to be received on one of the threaded studs protruding from the upper exterior surface of the valve body and held in place by the threaded nuts.

22. The method of claim 21 further including inserting a plurality of bushings each having an exterior diameter sized to be received in at least one of the openings of each of the bonnet clamps and having an internal diameter of sized to be received on the threaded studs protruding from the upper exterior surface of the valve body.

23. The method of claim 21 further including the step of attaching the adapter plate to the circular disk by inserting a threaded bolt into a threaded bore on the distal end of each of the at least two downwardly disposed connectors.

24. The method of claim 21 further including attaching the adapter plate to the blind flushing bonnet by inserting one of the at least two connectors through each of the at least two openings in the adapter plate, and contacting the bottom side of the circular disk with an upper side of the adapter plate, inserting an externally threaded end of at least one bolt through an opening in the adapter plate and threadably receiving said bolt in a threaded bore in the bottom of the circular disk.

25. A method of adjusting from a first position to a second position a flushing bonnet assembly for use in a globe valve, said valve having a valve body defining an internal cavity for receiving a linear reciprocating closure member and a first internal fluid passage connecting a valve inlet to the internal cavity and a second internal fluid passage connecting the internal cavity to a valve outlet, said internal cavity having an upper opening closed by a removable closure bonnet held in place with threaded nuts received on a plurality of threaded studs protruding from an upper exterior surface of the valve body, and a lower opening in the internal cavity having a closure seat adapted to receive the closure member, said method comprising:

provit a flushing bonnet assembly comprising a circular disk adapted to be received in the upper opening of the internal cavity, said flushing bonnet assembly further including at least two downwardly disposed connectors, each attached at a proximal end to the bottom side of the circular disk, an adapter plate removably attached to a distal end of the downwardly disposed connectors, at least two downwardly disposed legs connected at a proximal end to a bottom side of the adapter plate, and a seat protection ring connected to a distal end of the one or more legs, said seat protection ring being adapted to be disposed in close proximity to the closure seat;

removing the adapter plate attached to the circular disk by removing a threaded bolt from a threaded bore on the distal end of each of the at least two downwardly disposed connectors;

rotating the adapter plate at least 90 degrees but less than 180 degrees;

attaching the adapter plate to the circular disk by inserting the at least two connectors through at least two openings in the adapter plate;

contacting the bottom side of the circular disk with an upper side of the adapter plate; and inserting an externally threaded end of at least one bolt through an opening in the adapter plate and threadably receiving said bolt in a threaded bore in the bottom of the circular disk.

* * * * *

UNITED STATES PATENT AND TRADEMARK OFFICE
CERTIFICATE OF CORRECTION

PATENT NO.        : 8,413,672 B2                                                Page 1 of 1
APPLICATION NO.   : 12/782763
DATED             : April 9, 2013
INVENTOR(S)       : Tirrell It is certified that error appears in the above-identified patent and that said Letters Patent is hereby corrected as shown below:

In the Specification

In Column 4, Line 8, delete "at lest" and insert -- at least --, therefor.

In Column 4, Line 31, delete "is" and insert -- is a --, therefor.

In Column 4, Line 33, delete "is" and insert -- is a --, therefor.

In Column 11, Line 3, delete "arc" and insert -- are --, therefor.

In the Claims

In Column 12, Line 6, in Claim 5, delete "seat," and insert -- seat --, therefor.

Signed and Sealed this
Eighth Day of September, 2015

Michelle K. Lee
*Director of the United States Patent and Trademark Office*